United States Patent
Wang et al.

(10) Patent No.: US 10,642,657 B2
(45) Date of Patent: May 5, 2020

(54) CLIENT-SERVER ARCHITECTURE FOR MULTICORE COMPUTER SYSTEM TO REALIZE SINGLE-CORE-EQUIVALENT VIEW

(71) Applicant: THE HONG KONG POLYTECHNIC UNIVERSITY, Hong Kong (CN)

(72) Inventors: Qixin Wang, Hong Kong (CN); Zhu Wang, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 204 days.

(21) Appl. No.: 16/019,723

(22) Filed: Jun. 27, 2018

(65) Prior Publication Data

US 2020/0004594 A1    Jan. 2, 2020

(51) Int. Cl.
*G06F 15/16* (2006.01)
*G06F 9/50* (2006.01)
(Continued)

(52) U.S. Cl.
CPC .......... *G06F 9/5027* (2013.01); *G06F 9/3877* (2013.01); *G06F 9/48* (2013.01); *G06F 9/544* (2013.01); *G06F 15/16* (2013.01); *G06F 21/123* (2013.01); *G06T 1/20* (2013.01); *H04L 67/42* (2013.01)

(58) Field of Classification Search
CPC ........ G06F 9/5027; G06F 9/3877; G06F 9/48; G06F 9/544; G06F 15/16; G06F 21/123
See application file for complete search history.

(56) References Cited

U.S. PATENT DOCUMENTS

| | | | |
|---|---|---|---|
| 8,332,866 B2* | 12/2012 | Kelley | G06F 9/547 |
| | | | 719/312 |
| 9,787,791 B2* | 10/2017 | Chetlur | H04L 67/02 |

(Continued)

OTHER PUBLICATIONS

L. Sha et al., "Real-Time Computing on Multicore Processors," IEEE Computer, pp. 69-77, Sep. 2016.
(Continued)

*Primary Examiner* — Moustafa M Meky
(74) *Attorney, Agent, or Firm* — Spruson & Ferguson (Hong Kong) Limited (57) ABSTRACT

A client-server architecture is used in a multicore computer system to realize a single-core-equivalent (SCE) view. In the system, plural stacks, each having a core and a local cache subsystem coupled thereto, are divided into a client stack for running client threads, and server stacks each for running server threads. A shared cache having shared cache blocks, each coupled to the client stack and to one or more server stacks, is also used. The core of an individual server stack is configured such that computing resources utilizable in executing the server thread(s) are confined to the individual server stack and the shared cache block coupled thereto, isolating an inter-core interference caused by the server thread(s) to the client thread(s) to within the individual server stack, the shared cache block coupled thereto, any server stack coupled to this shared cache block, and the client stack to thereby realize the SCE view.

20 Claims, 4 Drawing Sheets

(51) Int. Cl.
| | |
|---|---|
| G06F 9/48 | (2006.01) |
| G06F 21/12 | (2013.01) |
| G06F 9/38 | (2018.01) |
| H04L 29/06 | (2006.01) |
| G06T 1/20 | (2006.01) |
| G06F 9/54 | (2006.01) |

(56) References Cited

U.S. PATENT DOCUMENTS

2005/0283529 A1* 12/2005 Hsu .................. H04L 67/1095
709/224
2008/0126762 A1* 5/2008 Kelley ................ G06F 9/547
712/225
2015/0215417 A1* 7/2015 Chetlur ................ H04L 67/02
709/213

OTHER PUBLICATIONS

L. Sha et al., "Position Paper on Minimal Multicore Avionics Certification Guidance," draft 3.8, published by Federal Aviation Administration, United States Department of Transportation, Feb. 22, 2016.

R. Pellizzoni and H. Yun, "Memory Servers for Multicore Systems," Proceedings of the IEEE Real-Time and Embedded Technology and Applications Symposium (RTAS), Apr. 11-14, 2016.

G. Yao, H. Yun, Z. P. Wu, R. Pellizzoni, M. Caccamo and L. Sha, "Schedulability Analysis for Memory Bandwidth Regulated Multicore Real-Time Systems," IEEE Transactions on Computers, vol. 65, issue 2, pp. 601-614, Feb. 2016.

H. Yun, G. Yao, R. Pellizzoni, M. Caccamo and L. Sha, "Memory Bandwidth Management for Efficient Performance Isolation in Multi-Core Platforms," IEEE Transactions on Computers, vol. 65, issue 2, pp. 562-576, Feb. 2016.

R. Mancuso, R. Pellizzoni, M. Caccamo, L. Sha and H. Yun, "WCET(m) Estimation in Multi-Core Systems using Single Core Equivalence," Proceedings of the 27th Euromicro Conference on Real-Time Systems, pp. 174-183, Jul. 8-10, 2015.

H. Yun, R. Pellizzoni and P. K. Valsan, "Parallelism-Aware Memory Interference Delay Analysis for COTS Multicore Systems," Proceedings of the 27th Euromicro Conference on Real-Time Systems, pp. 184-195, Jul. 8-10, 2015.

H. Kim, D. de Niz, B. Andersson, M. Klein, O. Mutlu and R. Rajkumar, "Bounding Memory Interference Delay in COTS-based Multi-Core Systems," Proceedings of the 20th IEEE Real-Time and Embedded Technology and Applications Symposium (RTAS), pp. 145-154, Apr. 15-17, 2014.

R. Mancuso, R. Dudko, E. Betti, M. Cesati, M. Caccamo and R. Pellizzoni, "Real-Time Cache Management Framework or Multi-core Architectures," Proceedings of the 19th IEEE Real-Time and Embedded Technology and Applications Symposium (RTAS), pp. 45-54, Apr. 9-11, 2013.

H. Yun, G. Yao, R. Pellizzoni, M. Caccamo and L. Sha, "MemGuard: Memory Bandwidth Reservation System for Efficient Performance Isolation in Multi-core Platforms," Proceedings of the 19th IEEE Real-Time and Embedded Technology and Applications Symposium (RTAS), pp. 55-64, Apr. 9-11, 2013.

* cited by examiner

CLIENT-SERVER ARCHITECTURE FOR MULTICORE COMPUTER SYSTEM TO REALIZE SINGLE-CORE-EQUIVALENT VIEW

BACKGROUND

Field of the Invention

The present invention generally relates to a multicore computer system. In particular, the present invention relates to such computer system having a single-core-equivalent view.

LIST OF REFERENCES

There follows a list of references that are occasionally cited in the specification. Each of the disclosures of these references is incorporated by reference herein in its entirety.

[1] L. Sha et al., "Real-Time Computing on Multicore Processors," *IEEE Computer*, pp. 69-77, September 2016.

[2] L. Sha et al., "Position Paper on Minimal Multicore Avionics Certification Guidance," draft 3.8, published by Federal Aviation Administration, United States Department of Transportation, Feb. 22, 2016.

[3] R. Pellizzoni and H. Yun, "Memory Servers for Multicore Systems," *Proceedings of the IEEE Real-Time and Embedded Technology and Applications Symposium (RTAS)*, Apr. 11-14, 2016.

[4] G. Yao, H. Yun, Z. P. Wu, R. Pellizzoni, M. Caccamo and L. Sha, "Schedulability Analysis for Memory Bandwidth Regulated Multicore Real-Time Systems," *IEEE Transactions on Computers*, vol. 65, issue 2, pp. 601-614, February 2016.

[5] H. Yun, G. Yao, R. Pellizzoni, M. Caccamo and L. Sha, "Memory Bandwidth Management for Efficient Performance Isolation in Multi-Core Platforms," *IEEE Transactions on Computers*, vol. 65, issue 2, pp. 562-576, February 2016.

[6] R. Mancuso, R. Pellizzoni, M. Caccamo, L. Sha and H. Yun, "WCET(m) Estimation in Multi-Core Systems using Single Core Equivalence," *Proceedings of the 27th Euromicro Conference on Real-Time Systems*, pp. 174-183, Jul. 8-10, 2015.

[7] H. Yun, R. Pellizzoni and P. K. Valsan, "Parallelism-Aware Memory Interference Delay Analysis for COTS Multicore Systems," *Proceedings of the 27th Euromicro Conference on Real-Time Systems*, pp. 184-195, Jul. 8-10, 2015.

[8] H. Kim, D. de Niz, B. Andersson, M. Klein, O. Mutlu and R. Rajkumar, "Bounding Memory Interference Delay in COTS-based Multi-Core Systems," *Proceedings of the 20th IEEE Real-Time and Embedded Technology and Applications Symposium (RTAS)*, pp. 145-154, Apr. 15-17, 2014.

[9] R. Mancuso, R. Dudko, E. Betti, M. Cesati, M. Caccamo and R. Pellizzoni, "Real-Time Cache Management Framework for Multi-core Architectures," *Proceedings of the 19th IEEE Real-Time and Embedded Technology and Applications Symposium (RTAS)*, pp. 45-54, Apr. 9-11, 2013.

[10] H. Yun, G. Yao, R. Pellizzoni, M. Caccamo and L. Sha, "MemGuard: Memory Bandwidth Reservation System for Efficient Performance Isolation in Multi-core Platforms," *Proceedings of the 19th IEEE Real-Time and Embedded Technology and Applications Symposium (RTAS)*, pp. 55-64, Apr. 9-11, 2013.

Description of Related Art

Most of today's computers have evolved from using single core processors to using multicore processors. Typically, for such computers, each processor hosts multiple cores that typically run threads (in this document, we refer to processes and/or threads generically as "threads") in parallel.

Although parallelism can generally speed up computing, it complicates per-thread behavior due to resource sharing: from cache(s), to bus(es), main memory, and input/output (IO) device(s). Conflict in resource sharing can cause serious problems in certain application domains. For example, in avionics, software is required to pass rigorous certification procedures to prove real-time performance that is claimed. With parallelism introduced by the presence of multiple cores, threads can interfere each other in more complicated ways due to resource sharing. Existing certifications based on single-core processor models no longer sustain. Yet how to certify the software based on a multicore processor model is still an open problem. As such, it is desirable to have a technical solution to realize a single-core-equivalent (SCE) view of multicore computer systems, e.g., [1] and [2]. That is, although the computer processor hardware has a plurality of processing cores, threads running on the multicore processor can be analyzed as if the threads were running on a single core processor.

Figure 1:
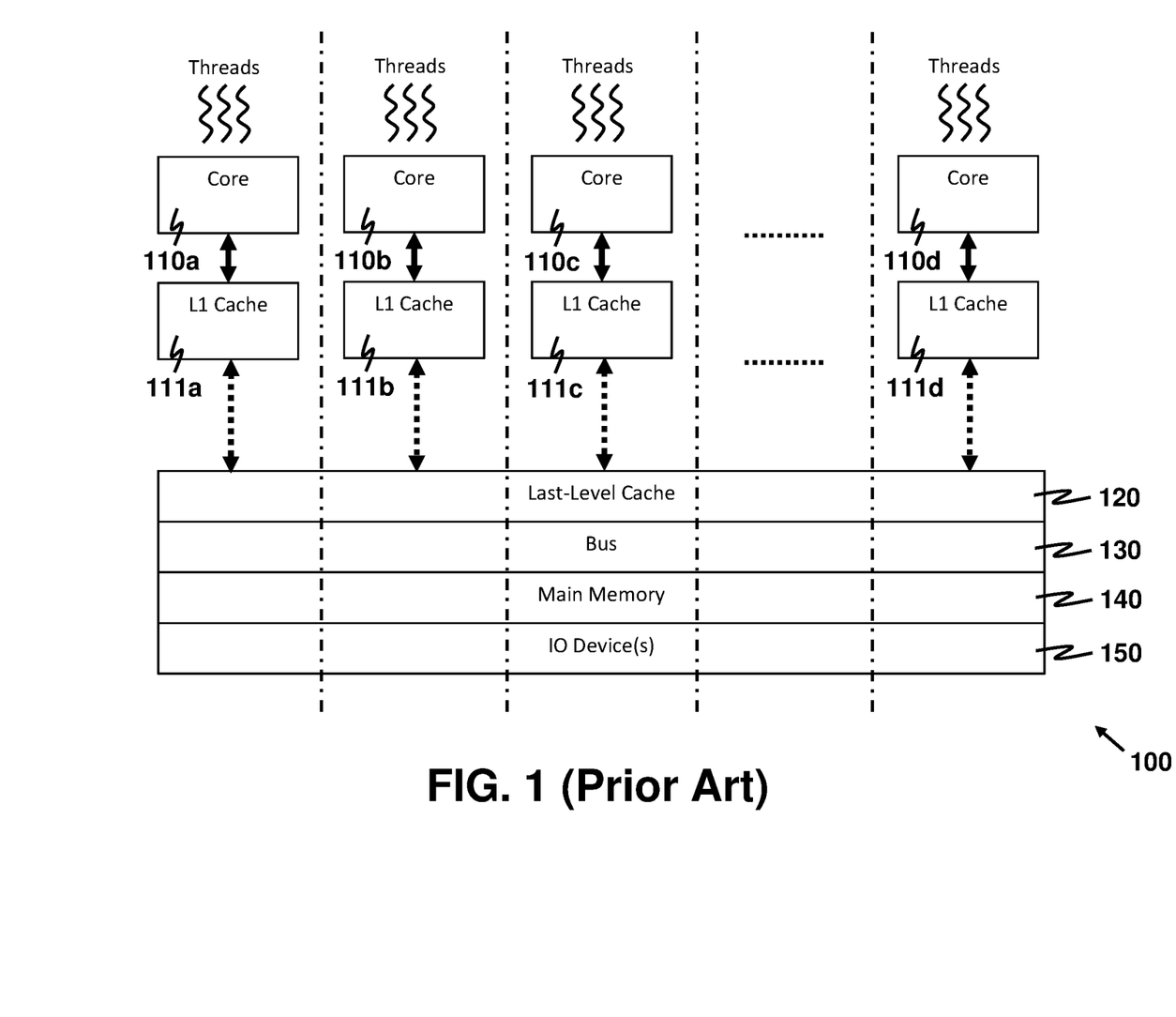
FIG. 1 pictorially depicts an existing approach of vertically partitioning computing resources for realizing an SCE view of a multicore computer system.

Existing solutions for realizing the SCE view for a multicore computer system are generally focused on vertically isolating cores and their respective share of resources, e.g. [3]-[10]. FIG. 1 pictorially depicts this approach. A multicore computer system 100 comprises a plurality of cores 110a-110d. Although it is straightforward for a system designer to allocate level-1 caches (simplified as "L1 caches"; in the following, we use the term "level-h cache" and "Lh cache" interchangeably, where h=1, 2, . . . ) 111a-111d (which are local cache memories) to the cores 110a-110d, the system designer is required to allocate other commonly-shared computing resources to the cores 110a-110d. These commonly-shared computing resources include lower level cache(s) 120, bus(es) 130, main memory 140 and one or more IO devices 150 such as a WiFi transceiver. Realizing vertical isolation of computing resources depends heavily on configuration details of the aforementioned commonly-shared computing resources. These configuration details are often proprietary and difficult to obtain. Missing one of such details can hamper the entire vertical isolation effort. As more computing resources (and hence configuration details) are often involved in new designs, more effort is expected to be required in designing vertical isolation of computing resources.

There is a need in the art for a technique that leads to simplicity in designing a multicore computer system by a system designer.

SUMMARY OF THE INVENTION

A first aspect of the present invention is to provide a multicore computer system having an SCE view.

The multicore computer system comprises a plurality of stacks and a shared cache. Each stack comprises a processing core and a local cache subsystem coupled thereto. The local cache subsystem is configured to provide one or more levels of cache memory for caching data and/or programs exclusively for the said processing core. The plurality of stacks is divided into a client stack and one or more server stacks. The shared cache comprises one or more shared cache blocks, each is coupled to the client stack and to one or more server stacks. The client stack is used for running one or more client threads, and an individual server stack is used for running one or more server threads. A client thread can access any resource on the computer system (e.g. the client stack, lower level cache(s), bus(es), main memory, IO devices) except the server stack(s). A server thread, however, can only access the resources on its hosting server stack, plus the shared cache block(s) coupled thereto (strictly speaking, a server thread is also allowed to access the bus(es) connecting the resources inside the server stack, and between the server stack and the shared cache block(s) coupled thereto; but for simplicity, we do not explicitly identify such bus(es) in the forthcoming description). An individual shared cache block is configured to provide a next level of cache memory to both the client stack and a respective server stack so as to facilitate communication between the client thread(s) and the server thread(s). Advantageously, the processing core of the individual server stack is configured such that computing resources utilizable in executing the server thread(s) are confined to the individual server stack and the shared cache block coupled thereto. Hence, an inter-core interference caused by the server thread(s) to the client thread(s) is isolated to within the individual server stack, the shared cache block coupled thereto (and other server stack(s) coupled to this shared cache block, if any) and the client stack. Thereby, the SCE view of the multicore computer system is realized.

The multicore computer system may further comprise an additional cache subsystem coupled to the client stack. The additional cache subsystem is configured to provide next one or more levels of cache memory to the client stack.

In one embodiment, the local cache subsystem of each stack is configured to provide only one level of cache memory.

In another embodiment, a scratchpad memory (SPM) and/or other faster-than-main-memory storage components (simplified as "fast-storage" in the following) is/are used to serve the purpose of the shared cache block(s).

According to a certain embodiment, the multicore computer system further comprises one or more additional computing resources coupled to the client stack. The one or more additional computing resources may include one or more buses, main memory, and/or IO devices.

A second aspect of the present invention is to provide a method for forming a multicore computer system having an SCE view.

The method comprises obtaining a plurality of stacks, and dividing the plurality of stacks into a client stack and one or more server stacks. Each stack comprises a processing core and a local cache subsystem coupled thereto. The local cache subsystem is configured to provide one or more levels of cache memory for caching data and/or programs exclusively for the said processing core. The client stack is used for running one or several client threads, and an individual server stack is used for running one or several server threads.

The method further comprises: obtaining a shared cache comprising one or more shared cache blocks, each is coupled to the client stack and to one or more server stacks; and configuring an individual shared cache block to provide a next level of cache memory to both the client stack and a respective server stack so as to facilitate communication between the client thread(s) and the server thread(s).

In the method, at least the plurality of stacks and the shared cache are integrated to form the multicore computer system.

The method additionally comprises configuring the processing core of each individual server stack to confine computing resources utilizable in executing the server thread(s) to the individual server stack and the shared cache block coupled thereto. As a result, an inter-core interference caused by the server thread(s) to the client thread(s) is isolated to within the individual server stack, the shared cache block coupled thereto (and other server stack(s) coupled to this shared cache block, if any) and the client stack, thereby realizing the SCE view.

Optionally, the method further comprises obtaining an additional cache subsystem coupled to the client stack, and configuring the additional cache subsystem to provide next one or more levels of cache memory to the client stack. In forming the multicore computer system, the additional cache subsystem is further integrated into the multicore computer system.

Other aspects of the present invention are disclosed as illustrated by the embodiments hereinafter.

DETAILED DESCRIPTION

The following terms are used herein in the specification and appended claims. "A core" and "a processing core" are used interchangeably to mean a processing unit that reads and executes program instructions. "A single-core processor" means a computing processor having only one core. "A single-core computer system" is a computer system containing only one core. "A multicore processor" means a computing processor containing a plurality of cores where the cores are configured to operate, or execute instructions, simultaneously or in parallel. Apart from the plurality of cores, the multicore processor may be integrated with other processing components such as a cache, a memory management unit (MMU), etc. "A multicore computer system" is a computer system containing a plurality of cores where the cores are configured to operate, or execute instructions, simultaneously or in parallel. To realize (or to have) an "SCE view" means that a multicore computer system is configured so that the real-time schedulability of any given task set on the system is equivalent to the real-time schedulability of a same (or deterministically transformed) task set on a single-core computer system.

Figure 2:
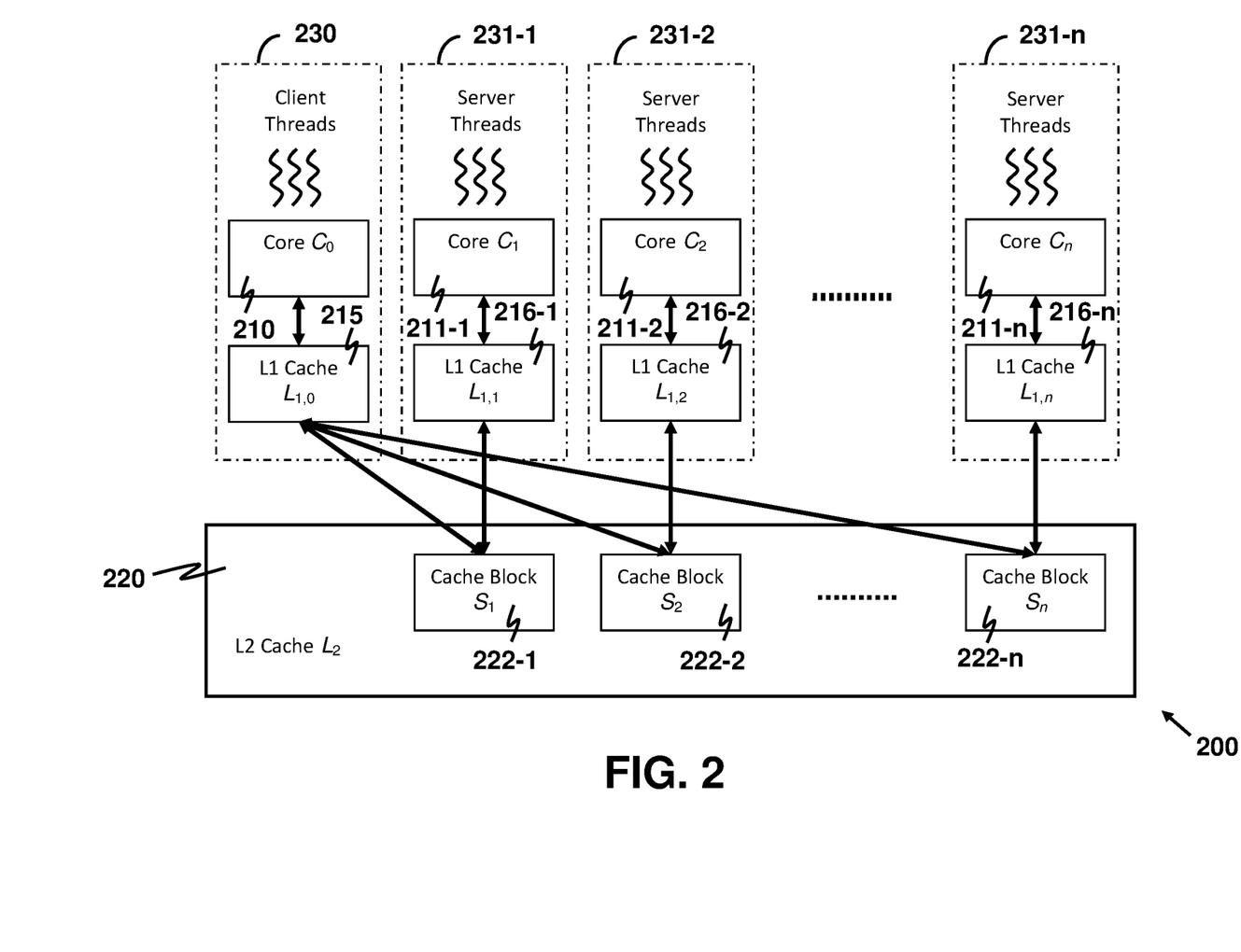
FIG. 2 depicts a client-server architecture of a multicore computer system in a simple but representative case for illustrating a working principle of realizing the SCE view.

In the present disclosure, a client-server architecture is disclosed for realizing an SCE view of a multicore computer system so as to achieve simplicity in system implementation and reduction in dependency on hardware and/or software configuration details of computing resources used in building the system. The working principle of the disclosed client-server architecture is hereinafter illustrated by, without loss of generality, considering a simple but representative case that resources utilizable in a multicore computer system are limited to a plurality of cores, level-1 (L1) caches and level-2 (L2) caches. FIG. 2 depicts a client-server architecture of the aforesaid case. A multicore computer system 200 having this architecture comprises a plurality of processing cores 210, 211-1:n, a plurality of L1 caches 215, 216-1:n and an L2 cache 220.

In the system 200, one of the cores 210, 211-1:n is chosen as the unique "client core" in the client-server architecture. The client core is arranged to run client threads. A server core is arranged to run server threads. Without loss of generality, the core $C_0$ 210 is chosen as the client core. All the other n cores 211-1:n involved in the client-server architecture are "server cores," respectively denoted as $C_i$ (i=1, . . . , n). The client core $C_0$ 210 and its exclusive L1 cache 215 (denoted as $L_{1,0}$) are collectively referred to as a "client stack" 230. The exclusive L1 cache 215 is a local cache for caching data and/or programs exclusively for the client core $C_0$ 210. For i∈{1, 2, . . . , n}, the server core $C_i$ 211-$i$ and its exclusive L1 cache 216-$i$ (denoted as $L_{1,i}$) are grouped as the ith server stack 231-$i$. Similarly, the exclusive L1 cache 216-$i$ is a local cache used for caching data and/or programs exclusively for the server core $C_i$ 211-$i$.

The L2 cache 220 is organized as follows. The L2 cache 220 includes a plurality of independent cache blocks 222-1:n. Server threads running on an individual server core $C_i$ 211-$i$, i∈{1, 2, . . . , n}, can only access $L_{1,i}$ 216-$i$ (i.e. the L1 cache in the same server stack 231-$i$) and a designated cache block (namely, $S_i$ 222-$i$) in the L2 cache 220. The cache block $S_i$ 222-$i$ is also accessible by client threads running on the client core $C_0$ 210. That is, $S_i$ 222-$i$ is the shared storage to allow communications between the client threads on $C_0$ 210 and the server threads on $C_i$ 211-$i$. Hence, $S_i$ 222-$i$ is named as the ith shared cache block.

An advantageous arrangement for realizing the SCE view of the multicore computer system 200 is that server threads running on $C_i$ 211-$i$, i∈{1, 2, . . . , n}, cannot access any computing resource other than the ith server stack 231-$i$ and $S_i$ 222-$i$. In this way, interferences caused by the server thread(s) running on $C_i$ 211-$i$ are isolated within the ith server stack 231-$i$, $S_i$ 222-$i$ (and other server stack(s) coupled to $S_i$ 222-$i$, if any), and the client stack 230. There is no need to consider inter-core interferences caused by the server core(s) 211-1:n at lower-level cache(s) (i.e. lower than the L2 cache 220, if there is any), bus(es), main memory and IO device(s). When scheduling resources, it is only required to analyze the client threads running on the client core $C_0$ 210. Executions in the server threads are reflected as blocking (or non-blocking) reads/writes (of the corresponding shared cache block) in the corresponding client thread's execution. Thus, it leads to a convenient, simple way to realize the SCE view, and this realization is much less dependent on hardware and/or software configuration details.

It is also easy to migrate legacy programs to the above-disclosed client-server architecture. Those skilled in the art can examine a program's code (including, but not limited to, a source code, an intermediate code (e.g., an assembly code), and/or a machine code) to identify excerpts of the code, where each of the identified excerpts is frequently executed and has a respective memory/cache footprint size small enough to fit in a server stack. Those skilled in the art may revise each of such excerpts to run as a server thread, and revise the remainder of the code to run as one or more client threads on the client core $C_0$ 210.

Based on the above-disclosed client-server architecture, and by generalizing the architecture for more than two levels of cache memory, the present invention is detailed as follows.

A first aspect of the present invention is to provide a multicore computer system having an SCE view. Exemplarily, the system is illustrated with reference to FIG. 3, which depicts a multicore computer system 300 that realizes an SCE view in accordance with an exemplary embodiment of the present invention.

Figure 3:
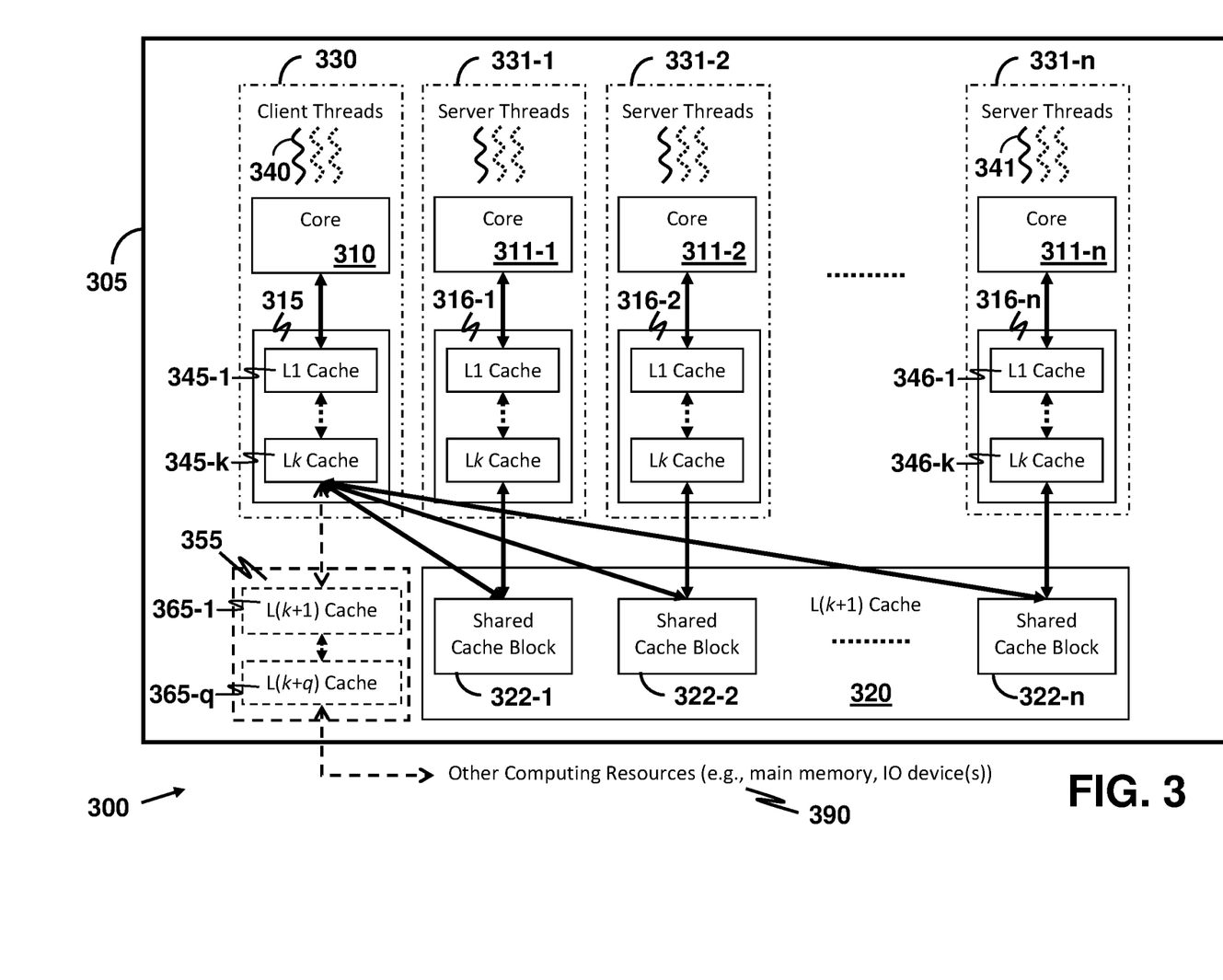
FIG. 3 depicts a multicore computer system having an SCE view in accordance with an exemplary embodiment of the present invention.

The multicore computer system 300 comprises a plurality of stacks 330, 331-1:n. Each of the stacks 330, 331-1:n comprises a processing core and a local cache subsystem coupled thereto. For example, a certain first stack 330 includes a first core 310 and a first local cache subsystem 315. Similarly, the remaining stacks 331-1:n comprise cores 311-1:n and local cache subsystems 316-1:n, respectively. An individual local cache subsystem is configured to provide one or more levels of cache memory for caching data and/or programs exclusively for the processing core of the corresponding stack. For instance, in the first stack 330, the first local cache subsystem 315 is formed by a cascade of an L1 cache 345-1 up to a level-k (Lk) cache 345-$k$, where the L1 cache 345-1 is coupled to the first core 310. As another example, a second local cache subsystem 316-$n$ of a second stack 331-$n$ is a cascade of an L1 cache 346-1 up to an Lk cache 346-$k$. In the special case that there is only one level of cache memory in the first local cache subsystem 315 (as shown in FIG. 2), k is equal to 1. The plurality of stacks 330, 331-1:n is divided into a client stack 330 and one or more server stacks 331-1:n. In the special case that there are only two stacks in the system 300, n takes a value of 1. The client stack 330 is used for running client threads (e.g., a client thread 340). An individual server stack (e.g., the server stack 331-$n$) is used for running server threads (e.g., a server thread 341).

The system 300 further comprises a level-(k+1) cache 320 that comprises one or more shared cache blocks 322-1:n. Each shared cache block 322-1:n is coupled to one or more server stacks 331-1:n. For example, the shared cache block 322-$n$ is coupled to the server stack 331-$n$. Furthermore, each shared cache block 322-1:n is coupled to the client stack 330. As a result, each shared cache block 322-1:n provides a communication channel between the client stack 330 and the corresponding server stack (e.g., the server stack 331-$n$). In this way, communication between the client thread(s) 340 and the server thread(s) 341 is facilitated.

Furthermore, the processing core of an individual server stack is configured such that computing resources utilizable in executing server threads by the aforesaid processing core are confined to the individual server stack and the shared cache block coupled thereto. As an example for illustration, consider execution of the server thread 341 by the core 311-$n$ in the server stack 331-$n$. The computing resources usable for executing the server thread 341 by the core 311-$n$ are confined to the core 311-$n$ itself, the local cache subsystem 316-$n$ and the shared cache block 322-$n$. As a result of this confinement, an inter-core interference caused by a server thread 341 to a client thread 340 is isolated to within the server stack 331-$n$, the shared cache block 322-$n$ coupled thereto (and other server stack(s) coupled to this shared cache block 322-$n$, if any) and the client stack 330. This isolation of the inter-core interference simplifies estimation of worst case execution time (WCET) of task sets, thereby realizing the SCE view of the multicore computer system 300.

Other aspects of the system 300 are elaborated as follows.

The system 300 may further include additional computing resources 390 usable by the core 310 of the client stack 330 in running the client thread(s) 340. These additional computing resources 390 may include a main memory, one or more IO devices, etc.

Depending on practical situations, an additional cache subsystem 355 coupled to the client stack 330 may be desirable to provide a cache for caching data and/or programs when the core 310 accesses the additional computing resources 390 in running the client thread(s) 340. For example, if the local cache subsystem 315 has only an L1 cache, it is often advantageous to include at least an L2 cache in the additional cache subsystem 355 for achieving a greater percentage of hits when the core 310 accesses the main memory. The additional cache subsystem 355 is configured to provide one next level of cache memory (namely, an L(k+1) cache 365-1) to the client stack 330. Depending on practical situations, alternatively the additional cache subsystem 355 may be configured to provide plural subsequent levels of cache memory (e.g., L(k+1) cache 365-1 to L(k+q) cache 365-$q$) to the client stack 330.

In some implementations, one or more of the cores 310, 311-1:n may each be connected to a scratchpad memory (SPM) and/or other faster-than-main-memory storage components (denoted as "fast-storage" in the following). In the system 300, the SPM and/or other fast-storage may be used to serve the purpose of the shared cache block(s) 322-1:n.

Each of the cores 310, 311-1:n may be a general-purpose processing unit, or a specialized processing unit such as a graphics processing unit (GPU) or a secure crypto processor. In the system 300, the cores 310, 311-1:n may be identical or may not entirely be the same. The present invention is not intended to limit the types of individual cores used in implementing the system 300.

In practical implementation, the cores 310, 311-1:n and various caches (including the local cache subsystems 315, 316-1:n, the shared cache 320, and the additional cache subsystem 355 if present) are often fabricated on an integrated circuit (IC) as a processor chip 305. The additional computing resources 390 in the system 300 may also be integrated with the cores 310, 311-1:n and the aforementioned various caches to form a system-on-chip (SoC). In this case, the disclosed client-server architecture may be referred to as a system-on-chip client-server (SoCCS) architecture.

A second aspect of the present invention is to provide a method for forming a multicore computer system having an SCE view. The development of the method is based on the rationale of developing the multicore computer system 300 as disclosed above. The method is illustrated with the aid of FIG. 4, which depicts a flowchart showing exemplary steps of forming the multicore computer system with the SCE view.

Figure 4:
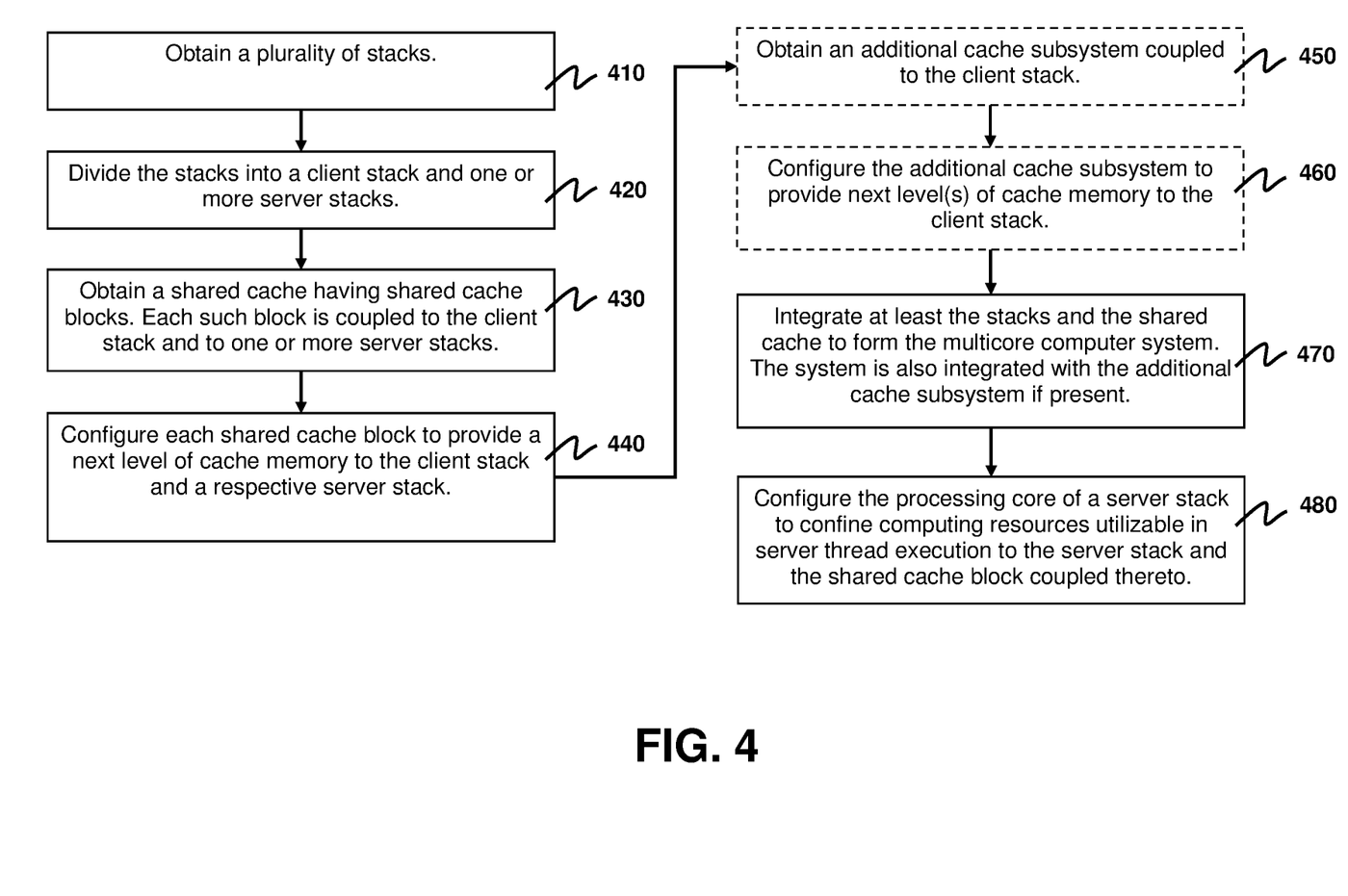
FIG. 4 depicts, in accordance with an exemplary embodiment of the present invention, a flowchart showing steps of forming a multicore computer system having an SCE view.

In a step 410, a plurality of stacks is obtained. Each stack comprises a processing core and a local cache subsystem coupled thereto. The local cache subsystem is configured to provide one or more levels of cache memory for caching data and/or programs exclusively for the aforesaid processing core.

The plurality of stacks is divided into a client stack and one or more server stacks in a step 420. The client stack is used for running client thread(s). An individual server stack is used for running server thread(s).

Afterwards, a shared cache is obtained in a step 430. The shared cache comprises one or more shared cache blocks, each is coupled to the client stack and to the one or more server stacks. In some implementations, SPM and/or other fast-storage may be used to serve the purpose of the shared cache block(s).

In a step 440, configure an individual shared cache block to provide a next level of cache memory to both the client stack and a respective server stack. Thereby, communication between the client thread(s) and the server thread(s) is facilitated and enabled.

Optionally, an additional cache subsystem coupled to the client stack is obtained in a step 450. Subsequently in a step 460, configure the additional cache subsystem to provide next one or more levels of cache memory to the client stack.

After the shared cache and the plurality of stacks are obtained, in a step 470 the multicore computer system is formed by integrating at least the plurality of stacks and the shared cache. If the additional cache subsystem is present, the additional cache subsystem is also integrated into the multicore computer system in the step 470.

In a step 480, configure the processing core of the individual server stack to confine computing resources utilizable in executing the server thread(s) to the individual server stack and the shared cache block coupled thereto. As a result, an inter-core interference caused by the server thread(s) to the client thread(s) is isolated to within the individual server stack, the shared cache block coupled thereto (and other server stack(s) coupled to this shared cache block, if any) and the client stack. Thereby, the SCE view is realized for the multicore computer system.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A multicore computer system comprising:
   a plurality of stacks, each stack comprising a processing core and a local cache subsystem coupled thereto, the local cache subsystem being configured to provide one or more levels of cache memory for caching data or programs, or both, exclusively for the said processing core, the plurality of stacks being divided into a client stack and one or more server stacks, the client stack being used for running one or more client threads, an individual server stack being used for running one or more server threads; and
   a shared cache comprising one or more shared cache blocks, each coupled to the client stack and to the one or more server stacks, an individual shared cache block being configured to provide a next level of cache memory to both the client stack and a respective server stack so as to facilitate communication between the one or more client threads and the one or more server threads;
   wherein:
   the processing core of the individual server stack is configured such that computing resources utilizable in executing the one or more server threads are confined to the individual server stack and the shared cache block coupled thereto, isolating an inter-core interference caused by the one or more server threads to the one or more client threads to within the individual server stack, the shared cache block coupled thereto, any server stack coupled to this shared cache block, and the client stack to thereby realize a single-core-equivalent (SCE) view of the multicore computer system.

2. The multicore computer system of claim 1 further comprising:
an additional cache subsystem coupled to the client stack, the additional cache subsystem being configured to provide next one or more levels of cache memory to the client stack.

3. The multicore computer system of claim 2, wherein the system is formed as an integrated circuit chip.

4. The multicore computer system of claim 2, wherein the system is formed as a system-on-chip.

5. The multicore computer system of claim 1, wherein the local cache subsystem of each stack is configured to provide only one level of cache memory.

6. The multicore computer system of claim 5, wherein the system is formed as an integrated circuit chip.

7. The multicore computer system of claim 5, wherein the system is formed as a system-on-chip.

8. The multicore computer system of claim 1, wherein a scratchpad memory and/or other fast-storage is used to serve the purpose of the one or more shared cache blocks.

9. The multicore computer system of claim 8, wherein the system is formed as an integrated circuit chip.

10. The multicore computer system of claim 8, wherein the system is formed as a system-on-chip.

11. The multicore computer system of claim 1, wherein each core is a general-purpose processing unit or a specialized processing unit.

12. The multicore computer system of claim 11, wherein the specialized processing unit is a graphics processing unit (GPU) or a secure crypto processor.

13. The multicore computer system of claim 11, wherein the system is formed as an integrated circuit chip.

14. The multicore computer system of claim 11, wherein the system is formed as a system-on-chip.

15. The multicore computer system of claim 1 further comprising:
one or more additional computing resources coupled to the client stack, wherein the one or more additional computing resources may include one or more buses, main memory, and/or input/output (JO) devices.

16. The multicore computer system of claim 15, wherein the system is formed as a system-on-chip.

17. The multicore computer system of claim 1, wherein the system is formed as an integrated circuit chip.

18. The multicore computer system of claim 1, wherein the system is formed as a system-on-chip.

19. A method for forming a multicore computer system having a single-core-equivalent (SCE) view, the method comprising:
obtaining a plurality of stacks, wherein each stack comprises a processing core and a local cache subsystem coupled thereto, the local cache subsystem being configured to provide one or more levels of cache memory for caching data and, or programs, or both, exclusively for the said processing core;
dividing the plurality of stacks into a client stack and one or more server stacks, wherein the client stack is used for running one or more client threads, and an individual server stack is used for running one or more server threads;
obtaining a shared cache comprising one or more shared cache blocks, each coupled to the client stack and to one or more server stacks;
configuring an individual shared cache block to provide a next level of cache memory to both the client stack and a respective server stack so as to facilitate communication between the one or more client threads and the one or more server threads;
integrating at least the plurality of stacks and the shared cache to form the multicore computer system; and
configuring the processing core of the individual server stack to confine computing resources utilizable in executing the one or more server threads to the individual server stack and the shared cache block coupled thereto, whereby an inter-core interference caused by the one or more server threads to the one or more client threads is isolated to within the individual server stack, the shared cache block coupled thereto, any server stack coupled to this shared cache block, and the client stack to thereby realize the SCE view.

20. The method of claim 19 further comprising:
obtaining an additional cache subsystem coupled to the client stack;
configuring the additional cache subsystem to provide next one or more levels of cache memory to the client stack; and
in forming the multicore computer system, further integrating the additional cache subsystem into the multicore computer system.

* * * * *